United States Patent
Neelisetti et al.

(10) Patent No.: US 11,068,130 B1
(45) Date of Patent: Jul. 20, 2021

(54) AUTOMATIC RESTRUCTURING OF GRAPHICAL USER INTERFACE COMPONENTS BASED ON USER INTERACTION

(71) Applicant: ServiceNow, Inc., Santa Clara, CA (US)

(72) Inventors: V. S. M. R. K. Hareesh Neelisetti, Hyderabad (IN); Avishek Dalal, Hyderabad (IN)

(73) Assignee: ServiceNow, Inc., Santa Clara, CA (US)

(*) Notice: Subject to any disclaimer, the term of this patent is extended or adjusted under 35 U.S.C. 154(b) by 0 days.

(21) Appl. No.: 16/820,439

(22) Filed: Mar. 16, 2020

(51) Int. Cl.
*G06F 3/0482* (2013.01)
*H04L 29/08* (2006.01)

(52) U.S. Cl.
CPC ............ *G06F 3/0482* (2013.01); *H04L 67/22* (2013.01)

(58) Field of Classification Search
CPC .... G06F 3/0482; G06F 3/04817; G06F 3/048; G06F 9/451; G06F 8/38; H04L 67/22
See application file for complete search history.

(56) References Cited

U.S. PATENT DOCUMENTS

| | | |
|---|---|---|
| 5,799,292 A * | 8/1998 | Hekmatpour .......... G06N 5/022 706/11 |
| 6,609,122 B1 | 8/2003 | Ensor |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,610,512 B2 | 10/2009 | Gerber |
| 7,617,073 B2 | 11/2009 | Trinon |
| 7,689,628 B2 | 3/2010 | Garg |
| 7,783,744 B2 | 8/2010 | Garg |
| 7,890,802 B2 | 2/2011 | Gerber |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,224,683 B2 | 7/2012 | Manos |
| 8,225,195 B1 * | 7/2012 | Bryar .................. G06F 16/9577 715/206 |
| 8,266,096 B2 | 9/2012 | Navarrete |

(Continued)

*Primary Examiner* — Dino Kujundzic
(74) *Attorney, Agent, or Firm* — Fletcher Yoder PC

(57) ABSTRACT

A memory stores a hierarchy representing an arrangement of content for a graphical user interface (GUI), wherein the content includes sibling components that have a common parent component, wherein components of the GUI are respectively associated with position indicators and click counts. One or more processors are configured to: (i) provide a first representation of the GUI with the sibling components arranged according to a first ordering, wherein the first ordering is based on the position indicators of the sibling components; (ii) receive selections of the components, wherein the selections are received by way of the GUI; (iii) update the click counts based on the selections; (iv) recalculate the position indicators based on the click counts; and (v) provide a second representation of the GUI with the sibling components arranged according to a second ordering, wherein the second ordering is based on the position indicators as recalculated.

20 Claims, 14 Drawing Sheets

(56) References Cited

U.S. PATENT DOCUMENTS

| | | |
|---|---|---|
| 8,457,928 B2 | 6/2013 | Dang |
| 8,478,569 B2 | 7/2013 | Scarpelli |
| 8,674,992 B2 | 3/2014 | Poston |
| 8,689,241 B2 | 4/2014 | Naik |
| 8,743,121 B2 | 6/2014 | De Peuter |
| 8,887,133 B2 | 11/2014 | Behnia |
| 9,239,857 B2 | 1/2016 | Trinon |
| 9,535,737 B2 | 1/2017 | Joy |
| 9,557,969 B2 | 1/2017 | Sharma |
| 9,792,387 B2 | 10/2017 | George |
| 2002/0075302 A1* | 6/2002 | Simchik .............. G06F 16/9577 715/745 |
| 2009/0119278 A1* | 5/2009 | Cross .................... G06F 16/951 |
| 2013/0152001 A1* | 6/2013 | Lovitt ..................... G06F 9/451 715/765 |
| 2014/0082515 A1* | 3/2014 | Baalu ..................... G06F 3/0481 715/745 |
| 2016/0124625 A1* | 5/2016 | Lawton .............. H04N 21/4532 715/800 |
| 2016/0188166 A1* | 6/2016 | Wang ..................... G06F 9/451 715/745 |
| 2019/0349439 A1* | 11/2019 | Anders ................. G06F 16/955 |

\* cited by examiner

```
div.body
    div.header
    div.main            ← 640
        block.a
            tile.a
            tile.b
            tile.c
            tile.d
            tile.e
        block.b
            tile.f
            tile.g
            tile.h
            tile.i
            tile.j
        block.c
    div.footer
```

FIG. 6B

```
div.body
    div.header
    div.main            ← 640
        block.a
            tile.a
            tile.b
            tile.c
            tile.d
            tile.e
        block.b
            tile.g
            tile.f
            tile.h
            tile.i
            tile.j
        block.c
    div.footer
```

FIG. 7B

```
div.body
    div.header
    div.main                    ← 800
        block.1
            tile.1
                link.1
                    carousel.1
                link.2
            tile.2
        block.2
        block.3
    div.footer
```

FIG. 8

```
div.body
    div.header
    div.main          ← 640
        block.b
            tile.g
            tile.f
            tile.h
            tile.i
            tile.j
        block.a
            tile.a
            tile.b
            tile.c
            tile.d
            tile.e
        block.c
    div.footer
```

FIG. 9B

```
┌─────────────────────────────────────────────────────────────────────┐
│ RETRIEVE A HIERARCHY, CONTENT, POSITION INDICATORS AND CLICK COUNTS,│
│ WHEREIN THE HIERARCHY REPRESENTS AN ARRANGEMENT OF THE CONTENT FOR  │
│ A GRAPHICAL USER INTERFACE, WHEREIN THE CONTENT INCLUDES A PLURALITY│ ← 1000
│ OF SIBLING COMPONENTS THAT ARE AT A COMMON LEVEL OF THE HIERARCHY   │
│ AND HAVE A COMMON PARENT COMPONENT, WHEREIN COMPONENTS OF THE       │
│ GRAPHICAL USER INTERFACE ARE RESPECTIVELY ASSOCIATED WITH THE       │
│ POSITION INDICATORS AND THE CLICK COUNTS, WHEREIN THE CLICK COUNTS  │
│ ASSOCIATED WITH THE COMPONENTS REPRESENT SELECTIONS THEREOF, AND    │
│ WHEREIN THE POSITION INDICATORS OF THE COMPONENTS ARE RESPECTIVELY  │
│ BASED IN PART ON THEIR ASSOCIATED CLICK COUNTS                      │
└─────────────────────────────────────────────────────────────────────┘
                                   │
┌─────────────────────────────────────────────────────────────────────┐
│ PROVIDE, TO A CLIENT DEVICE, A FIRST REPRESENTATION OF THE GRAPHICAL│
│ USER INTERFACE WITH THE SIBLING COMPONENTS ARRANGED WITHIN THE      │ ← 1002
│ COMMON PARENT COMPONENT ACCORDING TO A FIRST ORDERING, WHEREIN THE  │
│ FIRST ORDERING IS BASED ON THE POSITION INDICATORS OF THE SIBLING   │
│ COMPONENTS                                                          │
└─────────────────────────────────────────────────────────────────────┘
                                   │
┌─────────────────────────────────────────────────────────────────────┐
│ RECEIVE, FROM THE CLIENT DEVICE, INDICATIONS OF SELECTIONS OF THE   │ ← 1004
│ COMPONENTS, WHEREIN THE SELECTIONS ARE RECEIVED BY WAY OF THE       │
│ GRAPHICAL USER INTERFACE                                            │
└─────────────────────────────────────────────────────────────────────┘
                                   │
┌─────────────────────────────────────────────────────────────────────┐
│ UPDATE THE CLICK COUNTS BASED ON THE SELECTIONS                     │ ← 1006
└─────────────────────────────────────────────────────────────────────┘
                                   │
┌─────────────────────────────────────────────────────────────────────┐
│ RECALCULATE THE POSITION INDICATORS BASED ON WEIGHTED FACTORS OF    │
│ THE CLICK COUNTS AS UPDATED, WHEREIN A PARTICULAR POSITION INDICATOR│ ← 1008
│ ASSOCIATED WITH A PARTICULAR COMPONENT OF THE SIBLING COMPONENTS IS │
│ RECALCULATED BASED ON A PARTICULAR CLICK COUNT OF THE PARTICULAR    │
│ COMPONENT                                                           │
└─────────────────────────────────────────────────────────────────────┘
                                   │
┌─────────────────────────────────────────────────────────────────────┐
│ PROVIDE, TO THE CLIENT DEVICE, A SECOND REPRESENTATION OF THE       │
│ GRAPHICAL USER INTERFACE WITH THE SIBLING COMPONENTS ARRANGED WITHIN│
│ THE COMMON PARENT COMPONENT ACCORDING TO A SECOND ORDERING, WHEREIN │ ← 1010
│ THE SECOND ORDERING IS BASED ON THE POSITION INDICATORS AS          │
│ RECALCULATED, WHEREIN THE PARTICULAR COMPONENT HAS A DIFFERENT      │
│ LOCATION IN THE SECOND ORDERING THAN THE FIRST ORDERING             │
└─────────────────────────────────────────────────────────────────────┘
                                   │
┌─────────────────────────────────────────────────────────────────────┐
│ WRITE THE POSITION INDICATORS AS RECALCULATED AND THE CLICK COUNTS  │ ← 1012
│ AS UPDATED                                                          │
└─────────────────────────────────────────────────────────────────────┘
```

FIG. 10

AUTOMATIC RESTRUCTURING OF GRAPHICAL USER INTERFACE COMPONENTS BASED ON USER INTERACTION

BACKGROUND

Most modern computer software is accessed by way of a graphical user interface (GUI). Whether displayed on a mobile device, laptop, personal computer, or other platform, such GUIs generally include of a hierarchy of components disposed in particular arrangements. These components may be a combination of one or more containers, blocks, text boxes, buttons, selectors, widgets, tiles, panes, carousels, and so on. Each component may include text content, image content, audio content, video content, links, or some combination thereof. Traditional GUIs render components in a predefined, preconfigured, or static fashion, in that these components may be arranged to fit on a screen in a particular way and in a particular hierarchy, and the ordering of the hierarchy and the components within each level of the hierarchy does not change. As a consequence, if the default component ordering does not reflect the actual usage volume of these components, frequently used components may be placed in locations that are inconvenient to the user.

SUMMARY

In modern software engineering, thousands of hours are spent developing GUIs and GUI frameworks that seek to provide users with relevant information in a fashion that is easy to navigate and aesthetically pleasing. Ideally, a GUI presents a user with the desired content in a convenient location, so that a small degree of manipulation or no manipulation of the GUI (e.g., by scrolling or loading new pages) is needed in order to view this content.

Nonetheless, it may be difficult for GUI designers to predict how a GUI is going to be utilized by various users after deployment. Further, as time goes on, the GUI may begin to be utilized for different functions or procedures than initially considered. As a result, GUIs that are designed to be static—with components that have a largely fixed ordering relative to one another—are unable to adapt to the initial or changing needs of their users.

The embodiments herein introduce ways of reordering the components of a GUI based on each component's relative utilization. For example, a particular set of GUI components may be at a certain level in a hierarchy and children of a particular parent component. These children components may have a default or initial ordering within the parent component that is representative of how they are to be displayed on the GUI.

As users utilize each respective component (e.g., by clicking on, tapping, selecting, or otherwise activating the component), a count of these utilizations is maintained per component. For sake of simplicity, this count will be referred to herein as a "click count" with the understanding that any form of activating or selecting a component may be considered a "click." From time to time, the GUI may reorder the child components based on these click counts.

For instance, the child components may be presented on the GUI—within the parent component—from left to right or top to bottom in descending order of click counts. Thus, the child component with the highest click count may be presented first in this ordering, the child component with the second-highest click count may be presented second in this ordering, and so on. In this fashion, the child components are arranged so that higher-utilized components are placed in more prominent locations on the GUI, while lower-utilized components are placed in less prominent locations.

As a result, users will be able to rapidly locate and manipulate the components with which they are most likely to interact. Here, an assumption is that the utilization of components in the past is reasonable predictive of future utilization of these components, which is true in many practical scenarios. By avoiding unnecessary scrolling and/or paging through components, GUI interaction time is reduced and users spend more time on the task at hand rather than seeking out components.

In some embodiments, various weights may be applied to the click count so that some number of initial clicks on a component are ignored for purposes of component placement, or given only a minor influence on component placement. Further, clicks may be weighted so that their significance increases or decreases with click count. In some cases, the cumulative click count of child components may be used to influence the GUI placement of their parent component, along with the parent component's own click count. This affect may propagate up the hierarchy with the ordering of higher-level parent components amongst their siblings being impacted by click counts of some or all of their immediate and/or non-immediate children.

Accordingly, a first example embodiment may involve memory storing a hierarchy representing an arrangement of content for a graphical user interface, wherein the content includes a plurality of sibling components that are at a common level of the hierarchy and have a common parent component, wherein components of the graphical user interface are respectively associated with position indicators and click counts, wherein the click counts associated with the components represent selections thereof, and wherein the position indicators of the components are respectively based in part on their associated click counts. The first example embodiment may also involve one or more processors configured to: (i) retrieve, from the memory, the hierarchy, the content, the position indicators and the click counts; (ii) provide, to a client device, a first representation of the graphical user interface with the sibling components arranged within the common parent component according to a first ordering, wherein the first ordering is based on the position indicators of the sibling components; (iii) receive, from the client device, indications of selections of the components, wherein the selections are received by way of the graphical user interface; (iv) update the click counts based on the selections; (v) recalculate the position indicators based on weighted factors of the click counts as updated, wherein a particular position indicator associated with a particular component of the sibling components is recalculated based on a particular click count of the particular component; (vi) provide, to the client device, a second representation of the graphical user interface with the sibling components arranged within the common parent component according to a second ordering, wherein the second ordering is based on the position indicators as recalculated, wherein the particular component has a different location in the second ordering than the first ordering; and (vii) write, to the memory, the position indicators as recalculated and the click counts as updated.

A second example embodiment may involve retrieving a hierarchy, content, position indicators and click counts, wherein the hierarchy represents an arrangement of the content for a graphical user interface, wherein the content includes a plurality of sibling components that are at a common level of the hierarchy and have a common parent component, wherein components of the graphical user interface are respectively associated with the position indicators and the click counts, wherein the click counts associated with the components represent selections thereof, and wherein the position indicators of the components are respectively based in part on their associated click counts. The second example embodiment may further involve providing, to a client device, a first representation of the graphical user interface with the sibling components arranged within the common parent component according to a first ordering, wherein the first ordering is based on the position indicators of the sibling components. The second example embodiment may further involve receiving, from the client device, indications of selections of the components, wherein the selections are received by way of the graphical user interface. The second example embodiment may further involve updating the click counts based on the selections. The second example embodiment may further involve recalculating the position indicators based on weighted factors of the click counts as updated, wherein a particular position indicator associated with a particular component of the sibling components is recalculated based on a particular click count of the particular component. The second example embodiment may further involve providing, to the client device, a second representation of the graphical user interface with the sibling components arranged within the common parent component according to a second ordering, wherein the second ordering is based on the position indicators as recalculated, wherein the particular component has a different location in the second ordering than the first ordering. The second example embodiment may further involve writing the position indicators as recalculated and the click counts as updated.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6B depicts a hierarchical representation of the GUI arrangement of FIG. 6A, in accordance with example embodiments.

FIG. 7B depicts a further hierarchical representation of the GUI arrangement of FIG. 7A, in accordance with example embodiments.

FIG. 8 depicts a hierarchical representation of a different GUI arrangement, in accordance with example embodiments.

FIG. 9B depicts an additional hierarchical representation of the GUI arrangement of FIG. 9A, in accordance with example embodiments.

FIG. 10 is a flow chart, in accordance with example embodiments.

DETAILED DESCRIPTION

Figure 1:
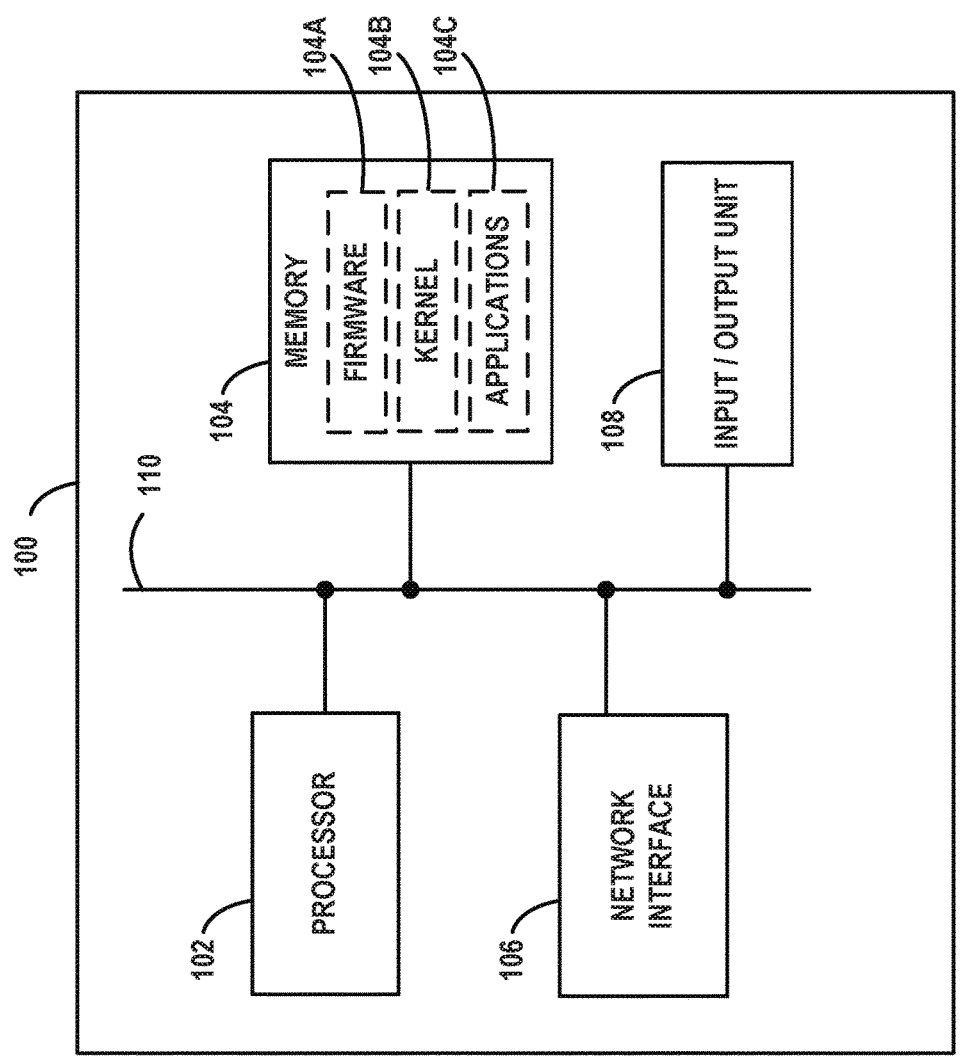
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
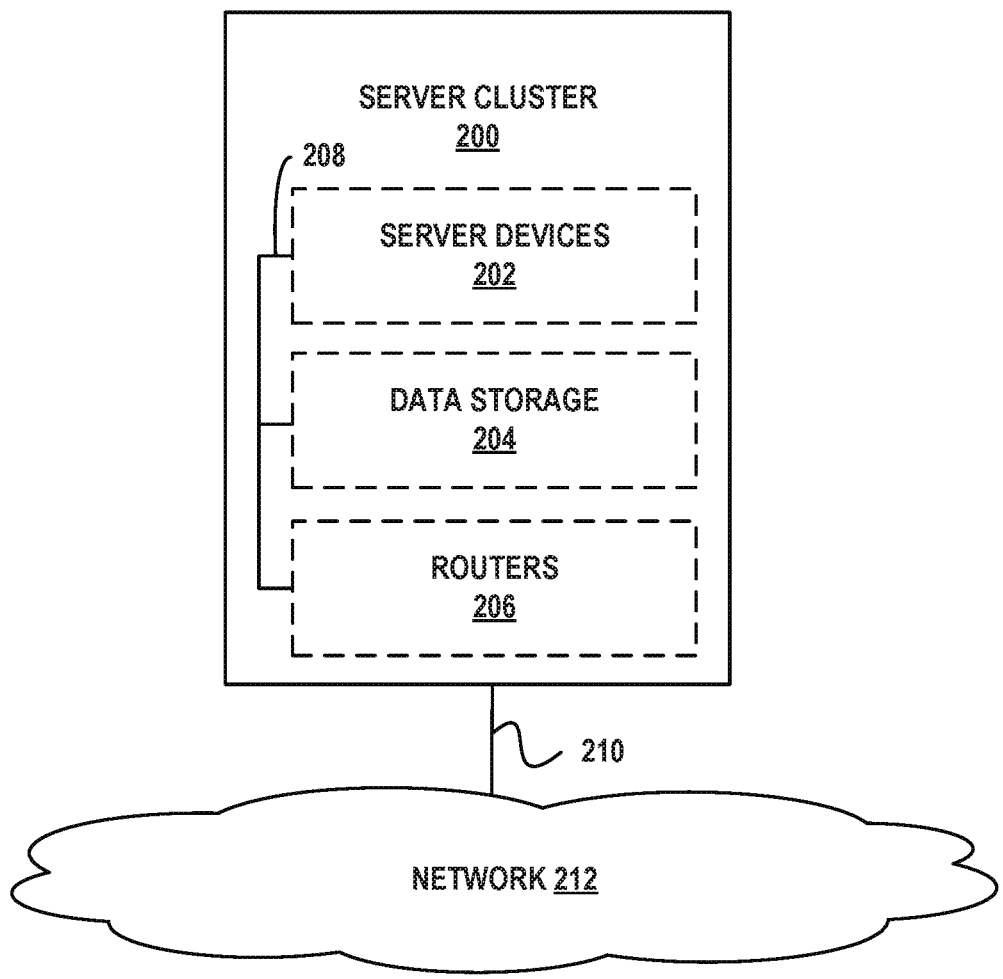
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. EXAMPLE REMOTE NETWORK MANAGEMENT ARCHITECTURE

Figure 3:
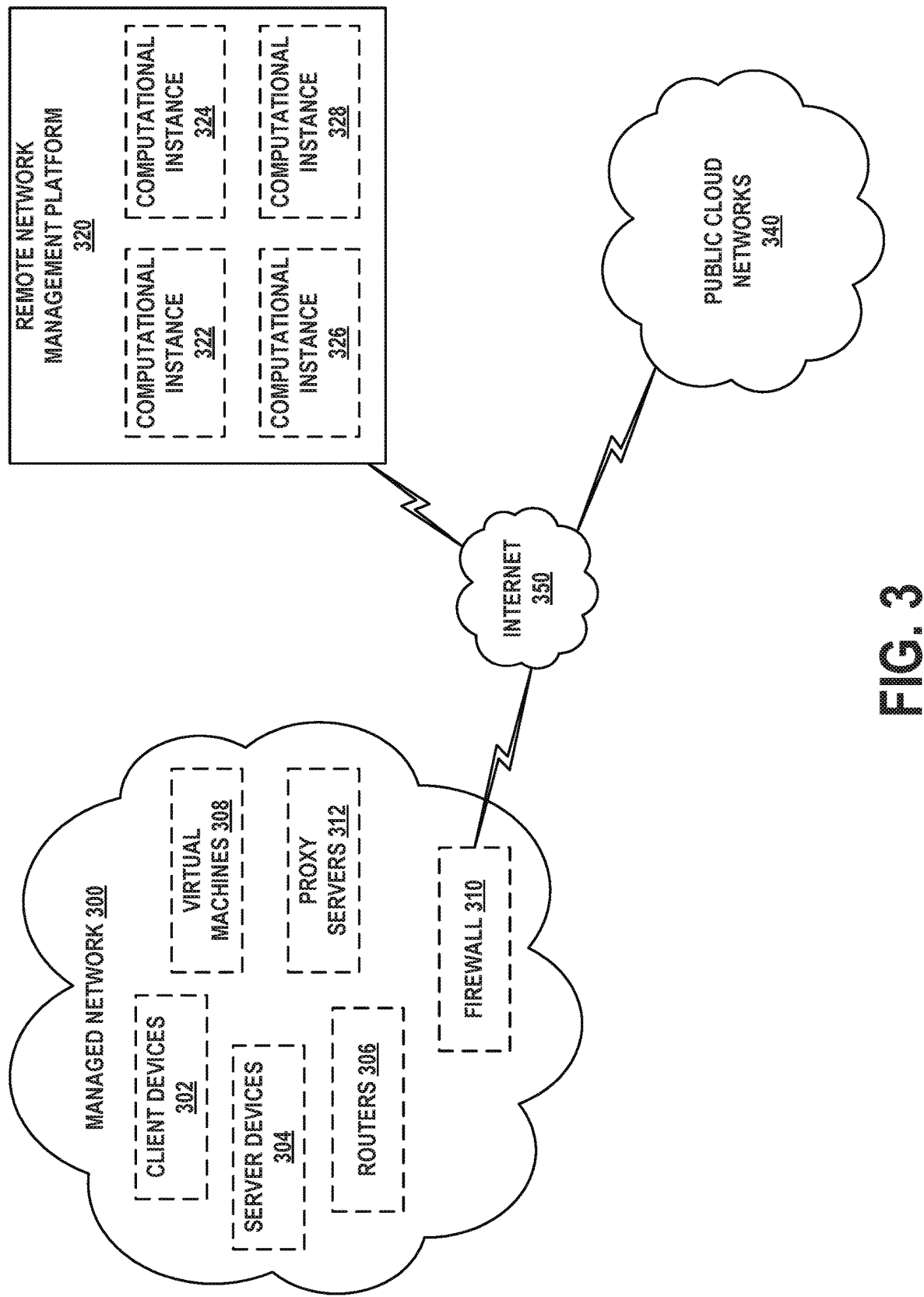
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
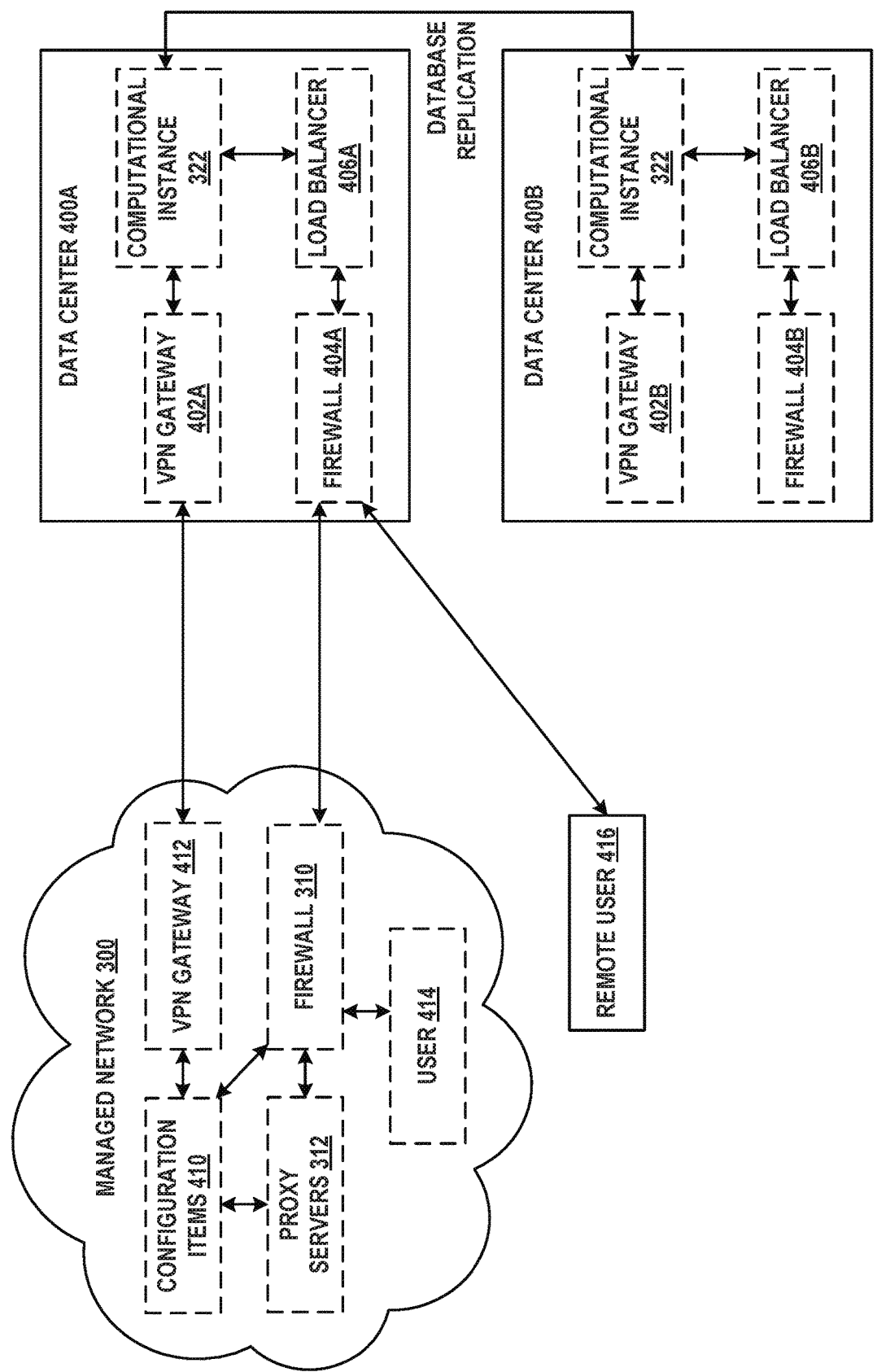
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
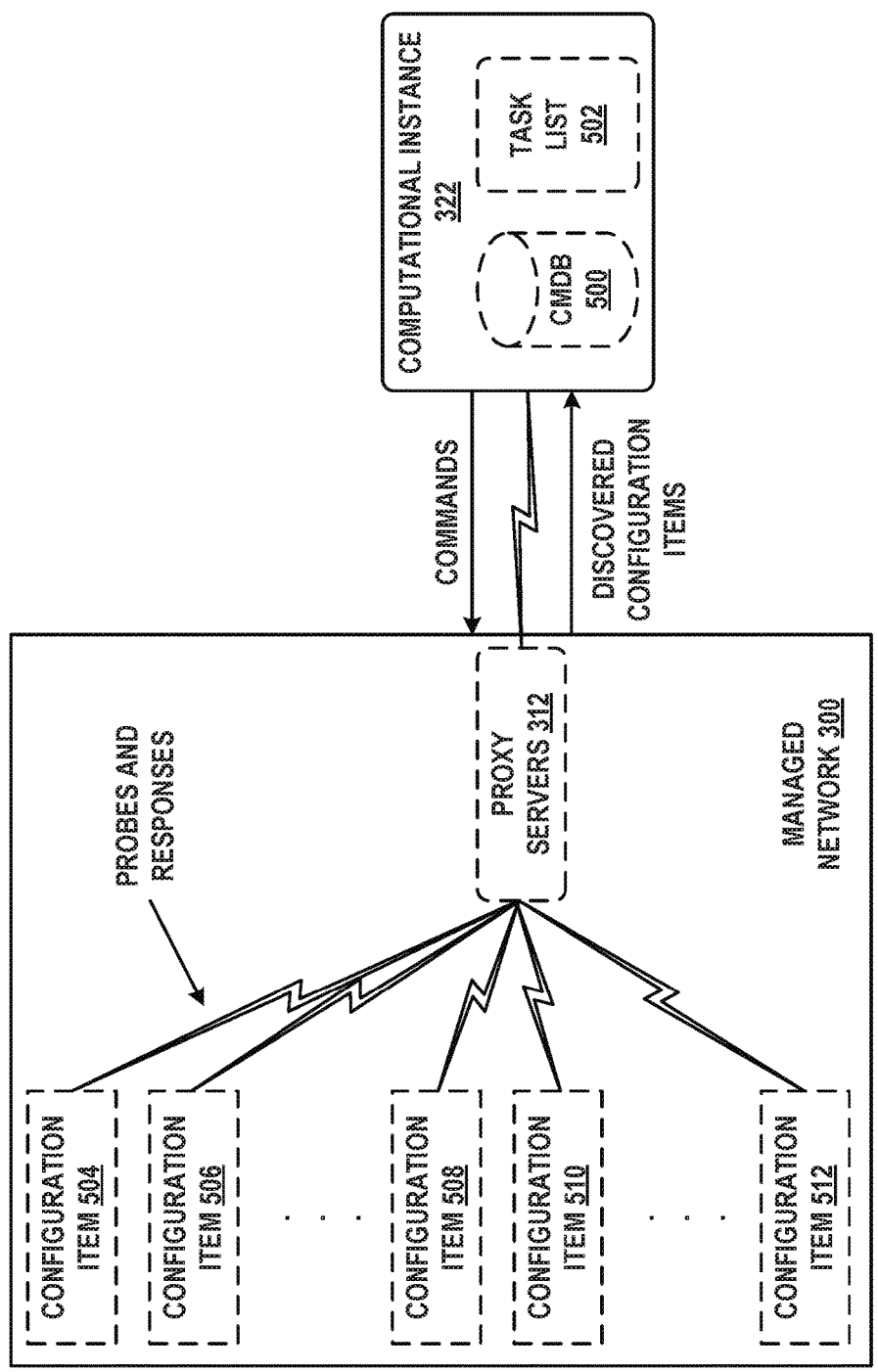
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
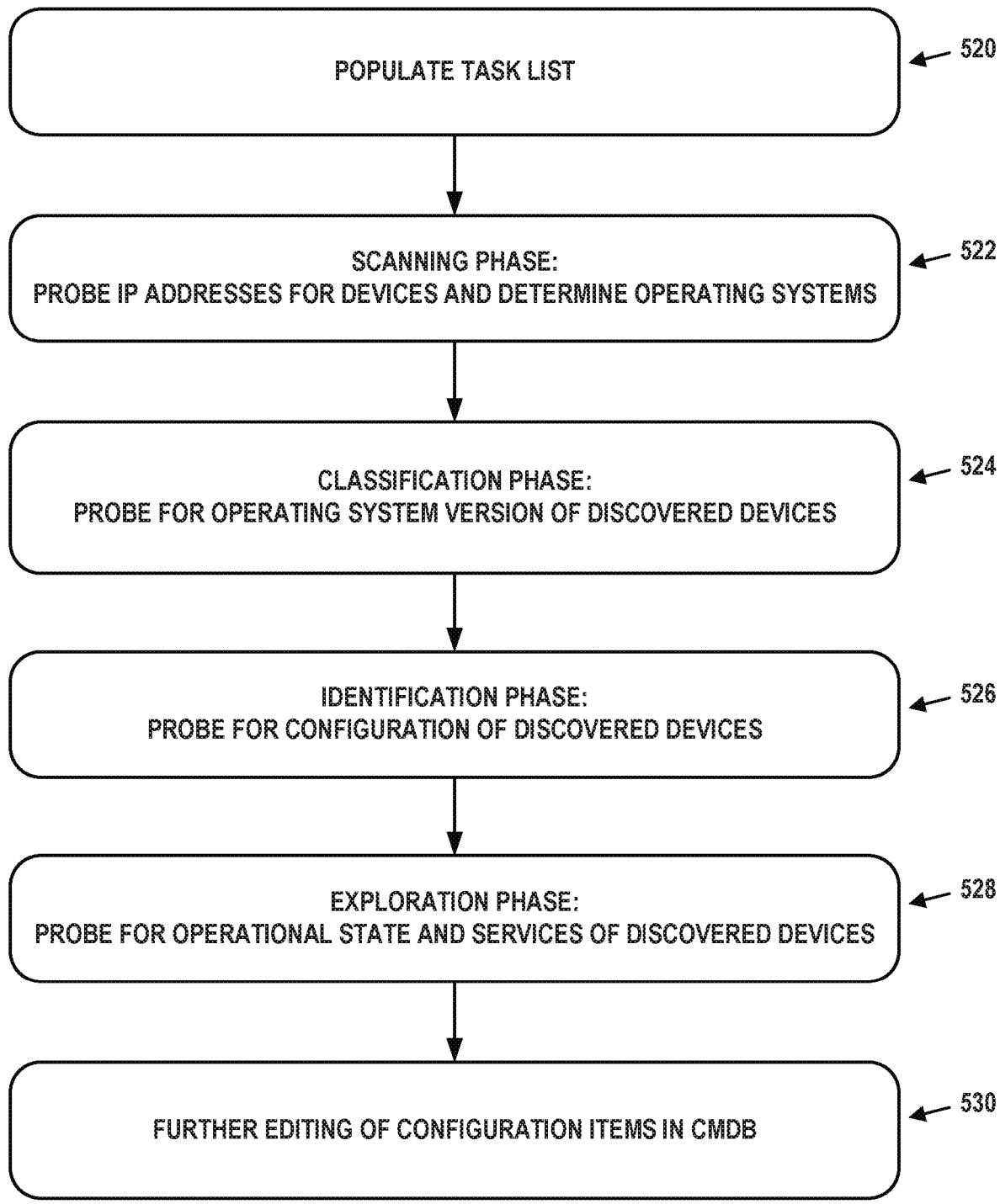
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. ADAPTIVE GUI COMPONENT ORDERING

A GUI may be considered to be an arrangement of visual components. These components include containers, containers, blocks, text boxes, buttons, selectors, widgets, tiles, panes, carousels, and so on. At least some components may include other components (e.g., a block that contains a set of tiles) or primitive elements such as text, hyperlink, image, audio, or video content (e.g., a tile that images an image).

The arrangement of components within a GUI may be hierarchical, in that the components disposed within other components can be represented as a tree or in a tree-like structure wherein each node corresponds to part of the GUI. For example, HTML-based web pages can be represented as document object model (DOM) trees, as can XML and JavaScript Object Notation (JSON) documents.

Figure 6A:
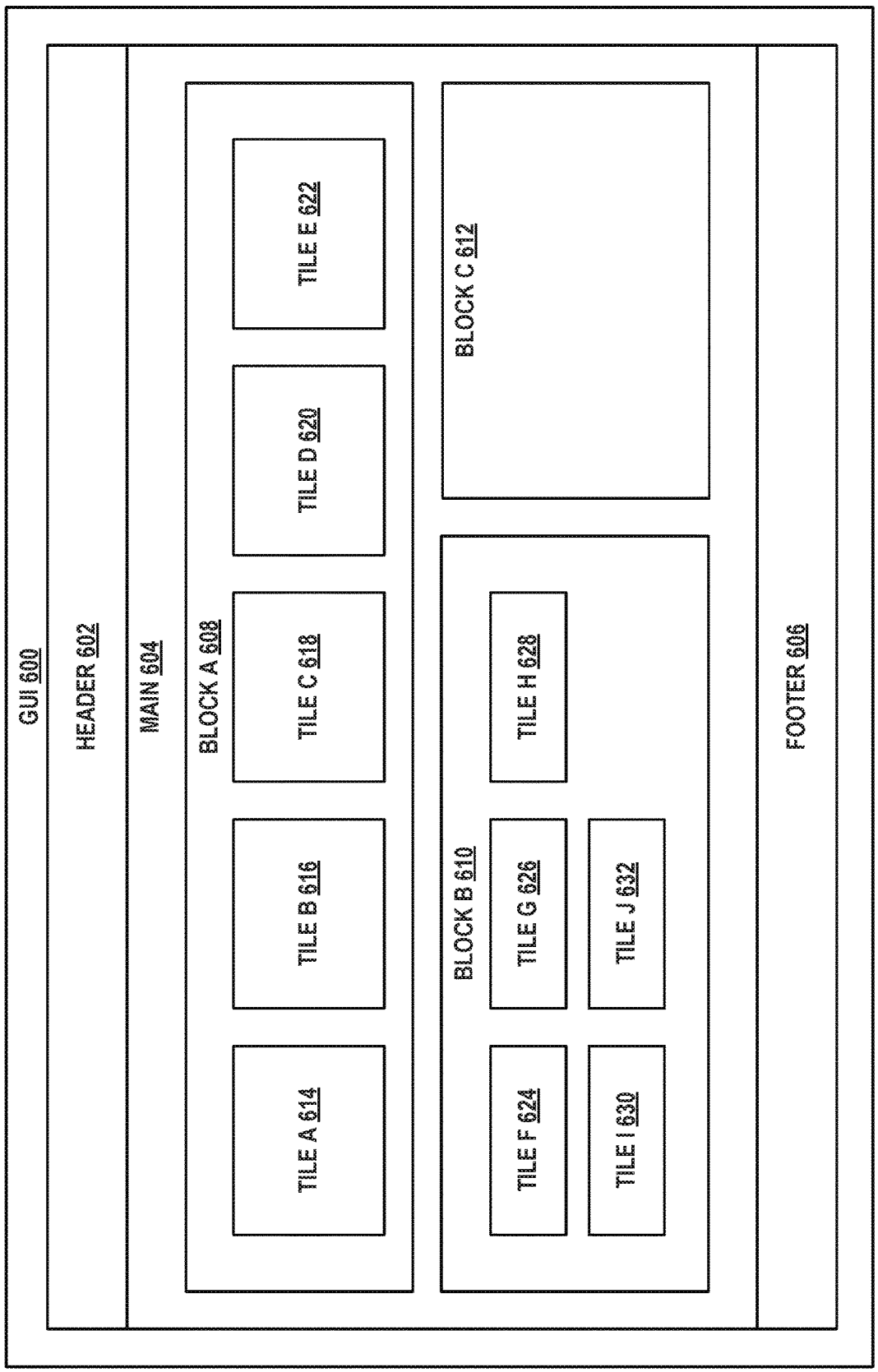
FIG. 6A depicts GUI arrangement, in accordance with example embodiments.

FIGS. 6A and 6B depicts an example GUI and its corresponding hierarchical representation. In particular, GUI 600 of FIG. 6A includes the components header 602, main 604, and footer 606. Main 604 includes block A 608, block B 610, and block C 612. Block A 608 includes tile A 614, tile B 616, tile C 618, tile D 620, and tile E 622. Block B 610 includes tile F 624, tile G 626, tile H 628, tile I 630, and tile J 632. Block C 612 does not include any further components.

FIG. 6B depicts a hierarchical representation of GUI 600. Notably, tree 640 includes a div.body element as root node, representing the whole of GUI 600. This root node has three child nodes, div.header (representing header 602), div.main (representing main 604), and div.footer (representing footer 606). The div.main node has three children, block.a (representing block A 608), block.b (representing block B 610), and block.c (representing block C 612). The block.a node has five children, tile.a, tile.b, tile.c, tile.d, and tile.e (representing tile A 614, tile B 616, tile C 618, tile D 620, and tile E 622, respectively). Similarly, the block.b node has five children, tile.f, tile.g, tile.h, tile.i, and tile.j 610 (representing tile F 624, tile G 626, tile H 628, tile I 630, and tile J 632, respectively). Here, the term "children" may refer to a particular component's immediate children (those components at a level below the particular component and having the particular component as a parent) or the particular component's immediate and non-immediate children (the particular component's immediate children, the children of these immediate children, and so on recursively down the hierarchy).

In this arrangement, there are several sets of sibling components. Siblings are defined to be components on the same level in tree 640 and having the same parent component. Thus, one set of siblings includes header 602, main 604, and footer 606. A second set of siblings includes block A 608, block B 610, and block C 612. A third set of siblings includes tile A 614, tile B 616, tile C 618, tile D 620, and tile E 622. A fourth set of siblings includes tile F 624, tile G 626, tile H 628, tile I 630, and tile J 632.

GUI 600 and tree 640 are presented for purposes of example. GUIs can have more or fewer components in different arrangements, and tree 640 can be represented in different ways. GUI 600 and tree 640 are just one possible way of representing the structure of a GUI, and the embodiments herein may work in conjunction with other types of representations.

As noted previously, traditional GUIs are designed to be static so that components have a largely fixed ordering relative to one another. These GUIs are unable to adapt to the initial or changing needs of their users. For example, suppose that a rather simple GUI consist of container in the form of an image carousel. In this example, the container could be the root node and the images would all be siblings of one another with the container as their parent.

The images may be arbitrarily ordered in the carousel. However, the principle of locality of reference (and possibly Zipf's Law as well) suggest that most of the clicks on images in the carousel will occur on a relatively small number of these images. For instance, if there are 40 images and 100 clicks, 50 of the clicks may be on 4 of the images. In practice, this phenomenon is often observed.

Since a carousel requires linearly progressing forward or backward though the images (usually one at a time), it may take a relatively large number of GUI interactions for a user to find the images that he or she wishes to view. Thus, leaving the ordering as images as is can result in the GUI not providing users with easy and rapid access to information, which defeats the purpose of GUI design. On the other hand, reordering the images based on click count can be used to place the most-accessed images in a carousel location that is less burdensome to reach.

In general, GUI components may also be utilized for different functions or procedures over time. This implies that any static ordering of components is potentially problematic, as it would be unable to adapt to the changing needs of users.

The embodiments herein introduce ways of reordering the sibling components of a GUI based on each component's relative utilization. This utilization may further be used to influence the ordering of these components' parent node amongst its siblings.

As users utilize each respective component, a "click count" of these utilizations is maintained per component. From time to time, the GUI may reorder the sibling components based on an ordering of these click counts. The reordering may also be based on geographical location (e.g., of a user or the server device providing the component), writing semantics (e.g., directionality), and/or other factors. For instance, the sibling components may be presented on the GUI within their parent component. Their arrangement within or under their parent may be from left to right or top to bottom in descending order of click counts. In this fashion, the child components are arranged so that higher-utilized components are placed in more prominent locations on the GUI, while lower-utilized components are placed in less prominent locations.

In some cases, the more prominent locations may be to the top and to the left of the GUI, but this behavior is configurable. Thus, writing systems with other directionalities, such as right to left where prominent locations are at the top right of the GUI, can be supported. Further, as illustrated by block A 608, prominence may be reflected column-wise or row-wise (e.g., more prominent locations being in higher columns, or in rows to one side of the parent component or the other). In block A 608, the top row has more prominence than the bottom row, and components are ordered left-to-right by prominence within these rows. Nonetheless, each of these options may be user-configurable.

As a result of these embodiments, users will be able to rapidly locate and manipulate the components with which they are most likely to interact. By avoiding unnecessary iterating, scrolling, and/or paging through components, GUI interaction time is reduced and users spend more time on the task at hand rather than seeking out components.

In order to facilitate these dynamic GUIs, weights may be assigned to components based on click count. These weights may vary based on the number of clicks, and whether each click was on the component itself or one of its children. The subsections below describe these possibilities.

In these embodiments, position indicator values and associated component orderings may be per user, per user group, or global. For per-user component ordering, each user may be presented with a different ordering of components based only on that user's clicks on components and their children. For per-user-group component ordering, users may be arranged into groups and users of each group may be presented with a different ordering of components based on that group's combined clicks on components and their children. For global component orderings, all users may be presented with the same ordering of components, where this ordering is based on these users' combined clicks on components and their children.

A. Component Ordering Based on Component Click Count

Each component may be arranged within its siblings based on a click count of that component compared to click counts of the siblings. Thus, each component may be associated with a non-negative, non-monotonically increasing click count.

Various embodiments may allow some components to be left out of this dynamic arrangement procedure and/or always placed in a fixed location. For example, such components may be designated, by way of a configuration page of a GUI or a configuration file, that they have a fixed location in the ordering of siblings and/or that their location is not impacted by click count. But other components may be repositioned based on their click count in relation to that of their siblings.

Upon initiation of the GUI (e.g., when the GUI is first deployed), each component among a group of siblings may have a default position indicator. These components may be initially ordered in accordance with their position indicators. In some embodiments, the position indicators are numeric, and the ordering may be lowest-to-highest. Thus, the component with the lowest position indicator may be in the most prominent location, the component with the second-lowest position indicator may be in the second-most prominent location, and so on. Alternatively, non-numeric position indicators may be used or the ordering may be highest-to-lowest. Other arrangements are possible.

When two or more components have the same position indicator (i.e., are tied in the ordering), a secondary factor may be taken into account when determining their ordering with respect to one another. Such a secondary factor could be based on the names of the tied components, object identifiers of the tied components, or a pre-configured default ordering. In the cases where a secondary factor is used, it may be based on an alphanumeric ordering of the secondary factors of the components.

For example, in the context of FIG. 6A, each of the tiles within block B 610 may have an initial position indicator of 1. Thus, these five components are "tied" with respect to their ordering within block B 610. The secondary factor used to break this tie may be their names. As indicated in FIG. 6B, tile F 624 may referred to as "tile.f", tile G 626 may be referred to as "tile.g", and so on. Thus, the tiles within block B 610 are shown as ordered in this fashion.

As one or more users click on theses tiles, their position indicators may be updated, which may in turn cause their ordering to change. In various embodiments, the position indicators may be updated based on the number of clicks per component, but these click may be weighted in various ways. For example, an initial number of clicks may be ignored (e.g., given a weight of 0) and/or clicks exceeding a particular click count threshold may be ignored. Further, the weights given to clicks that are not ignored can vary based on geographical region, a group to which the user clicking the component belongs, time of day, or other factors.

In one possible embodiment, clicks are ignored until the $m_\alpha$ click on a component is received. From the $m_\alpha$ click on, the component's position indicator is reduced by the product of the click number, i, and a weight, $w_i$. The click number may represent a count of clicks received by the component so far (e.g., for the $5^{th}$ click on a component, i=5, for the $6^{th}$ click on a component, i=6, and so on. The weight may vary with i or may be constant.

As noted above, some embodiments may involve the weight being based on a geographic region associated with the user who initiated the click (e.g., the user's home geographic location or current geographic location). Table 1 below provide examples of such weights.

TABLE 1

| Parameter | Description | Example value |
|---|---|---|
| ui_locale.apac | Location based weight from Asia Pacific (APAC) region associated with each click | 0.1 |
| ui_locale.amer | Location based weight from the Americas region associated with each click | 0.5 |
| ui_locale.emea | Location based weight from Europe, Middle East, and Africa (EMEA) region associated with each click | 0.2 |

In Table 1, clicks from the APAC region are given a weight of 0.1, clicks from the Americas region are given a weight of 0.5, and clicks from the EMEA region are given a weight of 0.2. These example weights are merely to illustrate that different regional preferences may apply with respect to the impact of clicks on the ordering of components. For instance, clicks from the Americas have a significantly higher impact on component ordering than clicks from the APAC region.

Alternatively, the region may indicate the locations to which the GUI is presented, and not the location of the users who click the GUI. Thus, for a computational instance installed in or serving APAC users, the APAC click weight (0.1) may be used regardless of from where the click is received.

The application of click counts to components can be defined recursively in terms of a component's position indicator (PI) as:

$$PI_i^\alpha = \begin{cases} PI_i^\alpha & \text{if } i < m_\alpha \\ PI_{i-1}^\alpha - (i \times w_i) & \text{if } i \geq m_\alpha \end{cases}$$

In this equation, $PI_i^\alpha$ represents the component's position indicator after the ith click on that component. It is assumed that $m_\alpha > 0$, $0 \leq w_i \leq 1$, and PI has some initial value that is used for the initial ordering of the components. The value of $m_\alpha$ may be between 2 and 100 or between 10 and 50 in some embodiments. The value of $w_i$ may be taken from Table 1. Thus, the position indicator of the component after the nth click on it can be expressed as:

$$PI_n^\alpha = PI_0^\alpha - \sum_{i=m_\alpha}^{n}(i \times w_i)$$

The position indicator may be saved as $PI_i^\alpha$ each time it is recalculated (to save processing time), or the position indicator may be calculated from the click count as $PI_n^\alpha$ (to save memory).

This embodiment results in a component's position indicator decreasing as the number of clicks on the component increases. Thus, the prominence of tile F 624, tile G 626, tile H 628, tile I 630, and tile J 632 within block B 610 would be based on a lowest-to-highest ordering of click counts of these components. In other words, the component with the lowest position indicator has the highest prominence, the component with the second lowest position indicator has the second highest prominence, and so on. In order embodiments, the position indicator may increase with click count and prominence of components may be based on a highest-to-lowest ordering of click counts of components.

An example of how $PI^\alpha$ changes is shown in Table 2. In this example, it is assumed that the component under consideration is tile G 626 and that PI for tile G 626 is 2, while $PI_0^\alpha$ for tile F 624 is 1. Thus, locations of components in block B 610 are determined by ascending order of their position indicators. It is further assumed that $w_i=0.5$ for all i and $m_\alpha=2$.

TABLE 2

| i | $PI_i^\alpha$ |
|---|---|
| 0 | 2 |
| 1 | 2 |
| 2 | 1 |
| 3 | −0.5 |
| 4 | −2.5 |
| 5 | −5.0 |
| 6 | −8.0 |

As the number of clicks on tile G 626 increases, its position indicator decreases. After the second click on tile G 626, its position indicator is tied with that of tile F 624 (assuming no clicks on tile F 624 during this period of time). This may cause tile G 626 to be moved up in prominence in block B 610, or the default behavior for such a tie may be to leave the ordering of components as is. Regardless, after the third click on tile G 626, it will be moved up in prominence in block B 610 (again, assuming no clicks on tile F 624 during this period of time or not enough such clicks to prevent this movement).

Figure 7A:
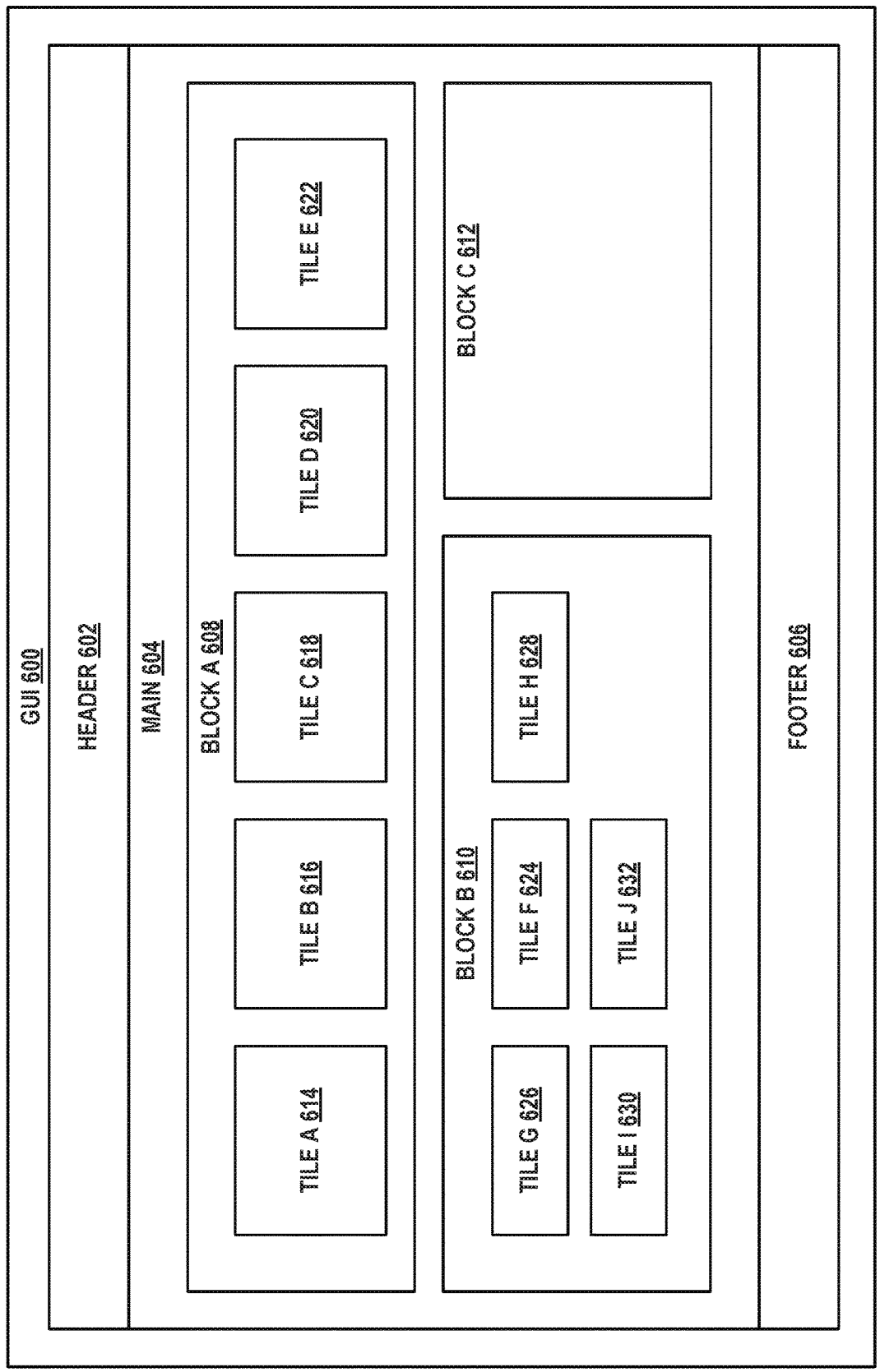
FIG. 7A depicts a further GUI arrangement, in accordance with example embodiments.

The impact of this on GUI 600 is represented in FIGS. 7A and 7B. In FIG. 7A, tile G 626 now appears in the most prominent position within block B 610, while tile F 624 appears in the second most prominent position. In FIG. 7B, tile.g appears before tile.f in tree 640.

B. Component Ordering Based on Child Click Count

In some embodiments, parent components may be arranged amongst their siblings based not only on their own click count, but a function of the click counts of their children as well. For example, the position of block A 608 may be influenced by the click counts of tile A 614, tile B 616, tile C 618, tile D 620, and tile E 622, while the position of block B may be influenced by the click counts of tile F 624, tile G 626, tile H 628, tile I 630, and tile J 632.

The application of child click counts to parent components can be defined recursively in terms of a parent component's position indicator as:

$$PI_i^\beta = \begin{cases} PI_i^\beta & \text{if } i < m_\beta \\ PI_{i-1}^\beta - \dfrac{i}{t \times b^j} & \text{if } i \geq m_\beta \end{cases}$$

In this equation, $PI_i^\beta$ represents the parent component's position indicator after the ith click on one of the parent component's children (this formula may be used independently for each of the parent component's immediate and non-immediate children). It is assumed that $m_\beta>0$, t is a weight used to modify the impact of each click (usually between 5 and 15), b is the base of an exponent (usually 2 or 3), j represents the level of the child being clicked relative to this component, and $PI_0^\beta$ has some initial value that is used for the initial ordering of the components. As before, the value of $m_\beta$ may be between 2 and 100 or between 10 and 50 in some embodiments. Thus, the position indicator of the component after the nth click on it can be expressed as $$PI_n^\beta = PI_0^\beta - \frac{1}{t \times b^j} \sum_{i=m_\beta}^{n} i$$

The value of j may be expressed as one less than the difference in level between the parent component and the child component. As an illustrative example, consider the component hierarchy 800 of FIG. 8. In this hierarchy, the component carousel.1 is one level below link.1, two levels below tile.1, and three levels below block.1. Thus, when component carousel.1 is clicked, PIP for link.1 is calculated with j=0, $PI^\beta$ for tile.1 is calculated with j=1, and $PI^\beta$ for block.1 is calculated with j=2. In this fashion, the impact of a click on any component is increasingly smaller on parent components at each higher level of the hierarchy.

The position indicator may be saved as $PI_i^\beta$ each time it is recalculated (to save processing time), or the position indicator may be calculated from the click count as $PI_n^\beta$ (to save memory).

A simpler, concrete example of how $PI^\beta$ changes is shown in Table 3. In this example, it is assumed that the component under consideration is block B 610 and that $PI_0^\beta$ for block B 610 is 2, while $PI_0^\beta$ for block A 608 is 1. Thus, locations of components in main 604 are determined by ascending order of their position indicators. It is further assumed that b=2, t=10, and $m_\beta=2$. Additionally, all clicks are on tile G 626, so j=0.

TABLE 3

| i | $PI_0^\beta$ |
|---|---|
| 0 | 2 |
| 1 | 2 |
| 2 | 1.9 |
| 3 | 1.75 |
| 4 | 1.55 |
| 5 | 1.3 |
| 6 | 1 |
| 7 | 0.65 |
| 8 | 0.25 |

As the number of clicks on tile G 626 increases, the position indicator of block B 610 decreases. After the sixth click on tile G 626, the position indicator of block B 610 is tied with that of block A 608 (assuming no clicks on block A 608 or its children during this period of time). This may cause block B 610 to be moved up in prominence in main 604, or the default behavior for such a tie may be to leave the ordering of components as is. Regardless, after the seventh click on tile G 626, block B 610 will be moved up in prominence in main 604 (again, assuming no clicks on block A 608 or its children during this period of time or not enough such clicks to prevent this movement).

Figure 9A:
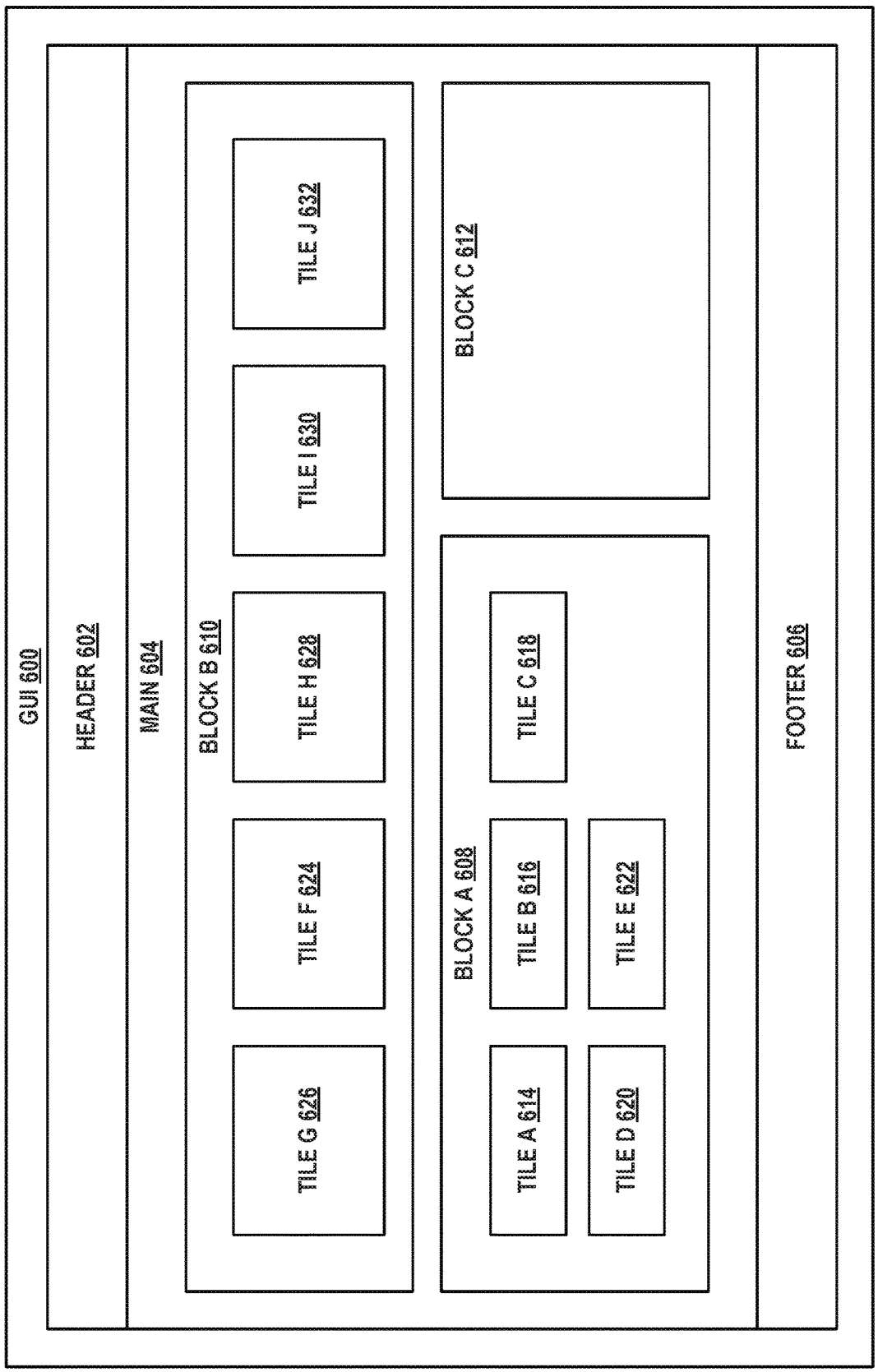
FIG. 9A depicts an additional GUI arrangement, in accordance with example embodiments.

This is represented in FIGS. 9A and 9B. In FIG. 9A, block B 610 now appears in the most prominent position within main 604, while block A 608 appears in the second most prominent position. In FIG. 9B, block.b appears before block.a in tree 640.

Similar to the previous embodiment, this embodiment results in a component's position indicator decreasing as the number of clicks on the component's children increases. Thus, the prominences of block A 608 and block B 610 are based on a lowest-to-highest ordering of these components. In other words, the component with the lowest position indicator has the highest prominence within main 604, the component with the second lowest position indicator has the second highest prominence, and so on.

C. Component Ordering Based on Component and Child Click Count

The embodiments above can be combined to provide a generalized position indicator for a parent's component that takes into account clicks on the parent component, as well as clicks on the immediate and non-immediate children of the parent component. This can be expressed as the sum of the two different types of position indicators described above, namely:

$$PI=PI_{n0}^{\alpha}+PI_{n1}^{\beta}+PI_{n2}^{\beta}+\ldots+PI_{nk}^{\beta}$$

This equation assumes that the parent component has k immediate and non-immediate children, that there were n0 clicks on the parent component and that there were n1 clicks on the first child component, n2 clicks on the second child component, and so on up to nk clicks on the kth child component. Thus, the position indicator of the parent component is based on clicks occurring on the parent component as well as clicks occurring on each of its immediate and non-immediate children.

VI. EXAMPLE OPERATIONS

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

Block 1000 may involve retrieving a hierarchy, content, position indicators and click counts, wherein the hierarchy represents an arrangement of the content for a graphical user interface, wherein the content includes a plurality of sibling components that are at a common level of the hierarchy and have a common parent component, wherein components of the graphical user interface are respectively associated with the position indicators and the click counts, wherein the click counts associated with the components represent selections thereof, and wherein the position indicators of the components are respectively based in part on their associated click counts.

Block 1002 may involve providing, to a client device, a first representation of the graphical user interface with the sibling components arranged within the common parent component according to a first ordering, wherein the first ordering is based on the position indicators of the sibling components.

Block 1004 may involve receiving, from the client device, indications of selections of the components, wherein the selections are received by way of the graphical user interface.

Block 1006 may involve updating the click counts based on the selections.

Block 1008 may involve recalculating the position indicators based on weighted factors of the click counts as updated, wherein a particular position indicator associated with a particular component of the sibling components is recalculated based on a particular click count of the particular component.

Block 1010 may involve providing, to the client device, a second representation of the graphical user interface with the sibling components arranged within the common parent component according to a second ordering, wherein the second ordering is based on the position indicators as recalculated, wherein the particular component has a different location in the second ordering than the first ordering.

Block 1012 may involve writing the position indicators as recalculated and the click counts as updated.

In some embodiments, the graphical user interface appears on the client device as a web page or part of a native application.

In some embodiments, the sibling components and the common parent component comprise one or more of containers, blocks, text boxes, buttons, selectors, widgets, tiles, panes, or carousels of the graphical user interface.

In some embodiments, the position indicators are numeric values that increase with increases to their associated click counts, and the first ordering and the second ordering sort the sibling components in decreasing order of their associated position indicators.

In some embodiments, the position indicators are numeric values that decrease with increases to their associated click counts, and the first ordering and the second ordering sort the sibling components in increasing order of their associated position indicators.

In some embodiments, the weighted factors of the click counts are based on a geographical location associated with the graphical user interface.

In some embodiments, recalculating the position indicators based on weighted factors of the click counts as updated comprises giving a weight of zero to clicks of the click counts that are lower than a predetermined threshold.

In some embodiments, the hierarchy indicates that the particular component is a parent of a plurality of child components, and the particular position indicator is further updated based on a set of the click counts associated with the child components. In these embodiments, a particular child component is associated with a specific click count, wherein recalculating the particular position indicator comprises: (i) multiplying, to form an intermediate value, a predetermined weight modifier by a predetermined base number raised to an exponent, wherein the exponent is based on a difference between levels of the particular component and the particular child component in the hierarchy; (ii) dividing, to form a second intermediate value, the specific click count by the intermediate value; and (iii) modifying the particular position indicator by adding or subtracting the second intermediate value.

In some embodiments, the predetermined weight modifier is between 5 and 15. In some embodiments, the predetermined base number is between 2 and 3. In some embodiments, the exponent is one less than the difference between levels of the particular component and the particular child component in the hierarchy. In some embodiments, recalculating the particular position indicator comprises giving a weight of zero to clicks of the specific click count that are lower than a predetermined threshold.

In some embodiments, the click counts are determined by: (i) selections of the components by a particular user, (ii) selections of the components by a particular group of users, or (iii) selections of the components all users of the system.

VII. CLOSING

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
    memory storing a hierarchy representing an arrangement of content for a graphical user interface, wherein the content includes a plurality of sibling components that are at a common level of the hierarchy and have a common parent component, wherein components of the graphical user interface are respectively associated with position indicators and click counts, wherein the click counts associated with the components represent selections thereof, and wherein the position indicators of the components are respectively based in part on their associated click counts; and
    one or more processors configured to:
        retrieve, from the memory, the hierarchy, the content, the position indicators and the click counts;
        provide, to a client device, a first representation of the graphical user interface with the sibling components arranged within the common parent component according to a first ordering, wherein the first ordering is based on the position indicators of the sibling components, and wherein the first ordering comprises the common parent component arranged in a first position relative to an additional parent component;
        receive, from the client device, indications of selections of the components, wherein the selections are received by way of the graphical user interface;

update the click counts based on the selections;

recalculate the position indicators based on weighted factors of the click counts as updated, wherein a particular position indicator associated with a particular sibling component of the sibling components is recalculated based on a particular click count of the particular sibling component;

determine a second position of the common parent component relative to the additional parent component based on the click counts;

provide, to the client device, a second representation of the graphical user interface with the sibling components arranged within the common parent component according to a second ordering, wherein the second ordering is based on the position indicators as recalculated, wherein the particular sibling component has a different location in the second ordering than the first ordering, and wherein the second position of the common parent component in the second ordering is different than the first position of the common parent component in the first ordering; and write, to the memory, the position indicators as recalculated and the click counts as updated.

2. The system of claim 1, wherein the graphical user interface appears on the client device as a web page or part of a native application.

3. The system of claim 1, wherein the sibling components and the common parent component comprise one or more of containers, blocks, text boxes, buttons, selectors, widgets, tiles, panes, or carousels of the graphical user interface.

4. The system of claim 1, wherein the position indicators are numeric values that increase with increases to their associated click counts, and wherein the first ordering and the second ordering sort the sibling components in decreasing order of their associated position indicators.

5. The system of claim 1, wherein the position indicators are numeric values that decrease with increases to their associated click counts, and wherein the first ordering and the second ordering sort the sibling components in increasing order of their associated position indicators.

6. The system of claim 1, wherein the weighted factors of the click counts are based on a geographical location associated with the graphical user interface.

7. The system of claim 1, wherein recalculating the position indicators based on weighted factors of the click counts as updated comprises giving a weight of zero to clicks of the click counts that are lower than a predetermined threshold.

8. The system of claim 1, wherein the hierarchy indicates that the particular sibling component is a parent of a plurality of child components, and wherein the particular position indicator is further updated based on a set of the click counts associated with the child components.

9. The system of claim 8, wherein a particular child component is associated with a specific click count, and wherein recalculating the particular position indicator comprises:

multiplying, to form an intermediate value, a predetermined weight modifier by a predetermined base number raised to an exponent, wherein the exponent is based on a difference between levels of the particular sibling component and the particular child component in the hierarchy;

dividing, to form a second intermediate value, the specific click count by the intermediate value; and modifying the particular position indicator by adding or subtracting the second intermediate value.

10. The system of claim 9, wherein the predetermined weight modifier is between 5 and 15.

11. The system of claim 9, wherein the predetermined base number is between 2 and 3.

12. The system of claim 9, wherein the exponent is one less than the difference between levels of the particular sibling component and the particular child component in the hierarchy.

13. The system of claim 9, wherein recalculating the particular position indicator comprises giving a weight of zero to clicks of the specific click count that are lower than a predetermined threshold.

14. The system of claim 1, wherein the click counts are determined by: (i) selections of the components by a particular user, (ii) selections of the components by a particular group of users, or (iii) selections of the components all users of the system.

15. A computer-implemented method comprising:

retrieving a hierarchy, content, position indicators and click counts, wherein the hierarchy represents an arrangement of the content for a graphical user interface, wherein the content includes a plurality of sibling components that are at a common level of the hierarchy and have a common parent component, wherein components of the graphical user interface are respectively associated with the position indicators and the click counts, wherein the click counts associated with the components represent selections thereof, and wherein the position indicators of the components are respectively based in part on their associated click counts;

providing, to a client device, a first representation of the graphical user interface with the sibling components arranged within the common parent component according to a first ordering, wherein the first ordering is based on the position indicators of the sibling components, and wherein the first ordering comprises the common parent component arranged in a first position relative to an additional parent component;

receiving, from the client device, indications of selections of the components, wherein the selections are received by way of the graphical user interface;

updating the click counts based on the selections;

recalculating the position indicators based on weighted factors of the click counts as updated, wherein a particular position indicator associated with a particular sibling component of the sibling components is recalculated based on a particular click count of the particular sibling component;

determining a second position of the common parent component relative to the additional parent component based on the click counts;

providing, to the client device, a second representation of the graphical user interface with the sibling components arranged within the common parent component according to a second ordering, wherein the second ordering is based on the position indicators as recalculated, wherein the particular sibling component has a different location in the second ordering than the first ordering, and wherein the second position of the common parent component in the second ordering is different than the first position of the common parent component in the first ordering; and writing the position indicators as recalculated and the click counts as updated.

16. The computer-implemented method of claim 15, wherein the position indicators are numeric values that increase with increases to their associated click counts, and wherein the first ordering and the second ordering sort the sibling components in decreasing order of their associated position indicators.

17. The computer-implemented method of claim 15, wherein the position indicators are numeric values that decrease with increases to their associated click counts, and wherein the first ordering and the second ordering sort the sibling components in increasing order of their associated position indicators.

18. The computer-implemented method of claim 15, wherein the hierarchy indicates that the particular sibling component is a parent of a plurality of child components, and wherein the particular position indicator is further updated based on a set of the click counts associated with the child components.

19. The computer-implemented method of claim 18, wherein a particular child component is associated with a specific click count, and wherein recalculating the particular position indicator comprises:
  multiplying, to form an intermediate value, a predetermined weight modifier by a predetermined base number raised to an exponent, wherein the exponent is based on a difference between levels of the particular sibling component and the particular child component in the hierarchy;
  dividing, to form a second intermediate value, the specific click count by the intermediate value; and
  modifying the particular position indicator by adding or subtracting the second intermediate value.

20. An article of manufacture including a non-transitory computer-readable medium, having stored thereon program instructions that, upon execution by a computing system, cause the computing system to perform operations comprising:
  retrieving a hierarchy, content, position indicators and click counts, wherein the hierarchy represents an arrangement of the content for a graphical user interface, wherein the content includes a plurality of sibling components that are at a common level of the hierarchy and have a common parent component, wherein components of the graphical user interface are respectively associated with the position indicators and the click counts, wherein the click counts associated with the components represent selections thereof, and wherein the position indicators of the components are respectively based in part on their associated click counts;
  providing, to a client device, a first representation of the graphical user interface with the sibling components arranged within the common parent component according to a first ordering, wherein the first ordering is based on the position indicators of the sibling components, and wherein the first ordering comprises the common parent component arranged in a first position relative to an additional parent component;
  receiving, from the client device, indications of selections of the components, wherein the selections are received by way of the graphical user interface;
  updating the click counts based on the selections;
  recalculating the position indicators based on weighted factors of the click counts as updated, wherein a particular position indicator associated with a particular sibling component of the sibling components is recalculated based on a particular click count of the particular sibling component;
  determining a second position of the common parent component relative to the additional parent component based on the click counts;
  providing, to the client device, a second representation of the graphical user interface with the sibling components arranged within the common parent component according to a second ordering, wherein the second ordering is based on the position indicators as recalculated, wherein the particular sibling component has a different location in the second ordering than the first ordering, and wherein the second position of the common parent component in the second ordering is different than the first position of the common parent component in the first ordering; and
  writing the position indicators as recalculated and the click counts as updated.

* * * * *